United States Patent
Nishimura

(10) Patent No.: US 7,330,206 B2
(45) Date of Patent: Feb. 12, 2008

(54) AUTO WHITE BALANCE CONTROLLING METHOD AND ELECTRONIC CAMERA

(75) Inventor: Tomoyuki Nishimura, Asaka (JP)

(73) Assignee: Fujifilm Corporation, Tokyo (JP)

( * ) Notice: Subject to any disclaimer, the term of this patent is extended or adjusted under 35 U.S.C. 154(b) by 763 days.

(21) Appl. No.: 10/445,081

(22) Filed: May 27, 2003

(65) Prior Publication Data

US 2003/0218677 A1 Nov. 27, 2003

(30) Foreign Application Priority Data

May 27, 2002 (JP) .............................. 2002-152272

(51) Int. Cl.
*H04N 9/73* (2006.01)

(52) U.S. Cl. ................................. 348/223.1

(58) Field of Classification Search ............. 348/223.1, 348/208.4, 208.12, 208.13, 222.1, 655, 362–369, 348/241, 243, 220.1, 229.1
See application file for complete search history.

(56) References Cited

U.S. PATENT DOCUMENTS 5,319,449 A * 6/1994 Saito et al. ............... 348/223.1
5,481,302 A 1/1996 Yamamoto et al.
6,567,123 B1 * 5/2003 Hashimoto ............... 348/229.1

FOREIGN PATENT DOCUMENTS

JP 6-351037 A 12/1994

* cited by examiner

Primary Examiner—David Ometz
Assistant Examiner—Tuan Le
(74) Attorney, Agent, or Firm—Birch, Stewart, Kolasch & Birch, LLP

(57) ABSTRACT

Auto white balance (AWB) processing is performed immediately after an electronic camera is turned on in a motion-picture-capturing mode, and an image being captured (a through image) is displayed on a liquid crystal monitor. When an image-capturing switch is pressed and an instruction to prepare for image-capturing is entered, white balance is fixed by performing AWB processing, and a motion picture is captured in response to an instruction to start the image-capturing. During the capturing of the motion picture, periodical AWB processing is not performed, an evaluation value for AE is obtained on a regular basis, and when the evaluation value changes by more than a predetermined value, the AWB processing is performed again. Thus, a load of processing is reduced for a control unit (CPU) included in the electronic camera, which can capture a motion picture, and the cost is also reduced. Moreover, a good image can be attained by making a white balance adjustment react instantaneously to a big change in a scene being captured.

10 Claims, 4 Drawing Sheets

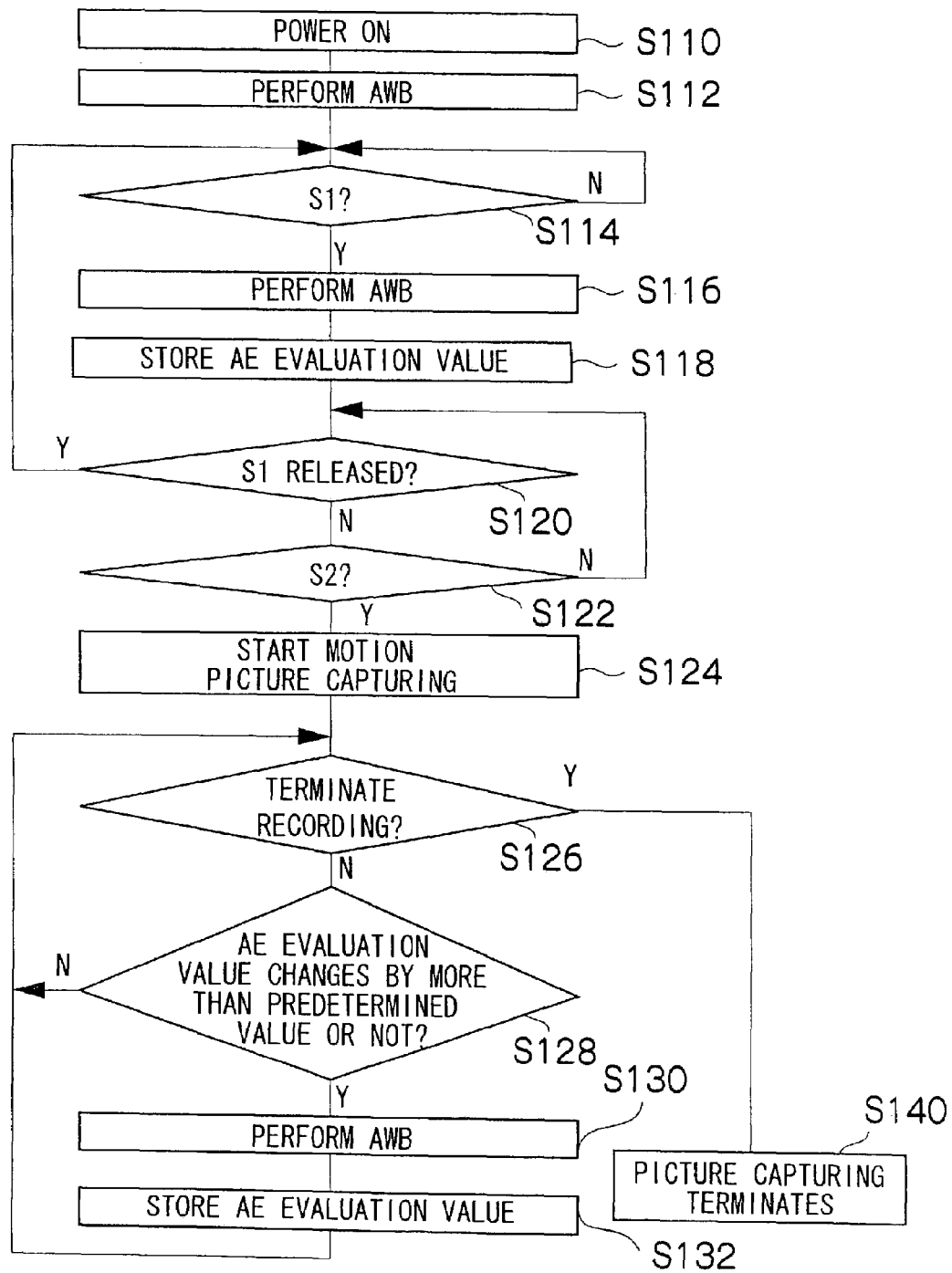

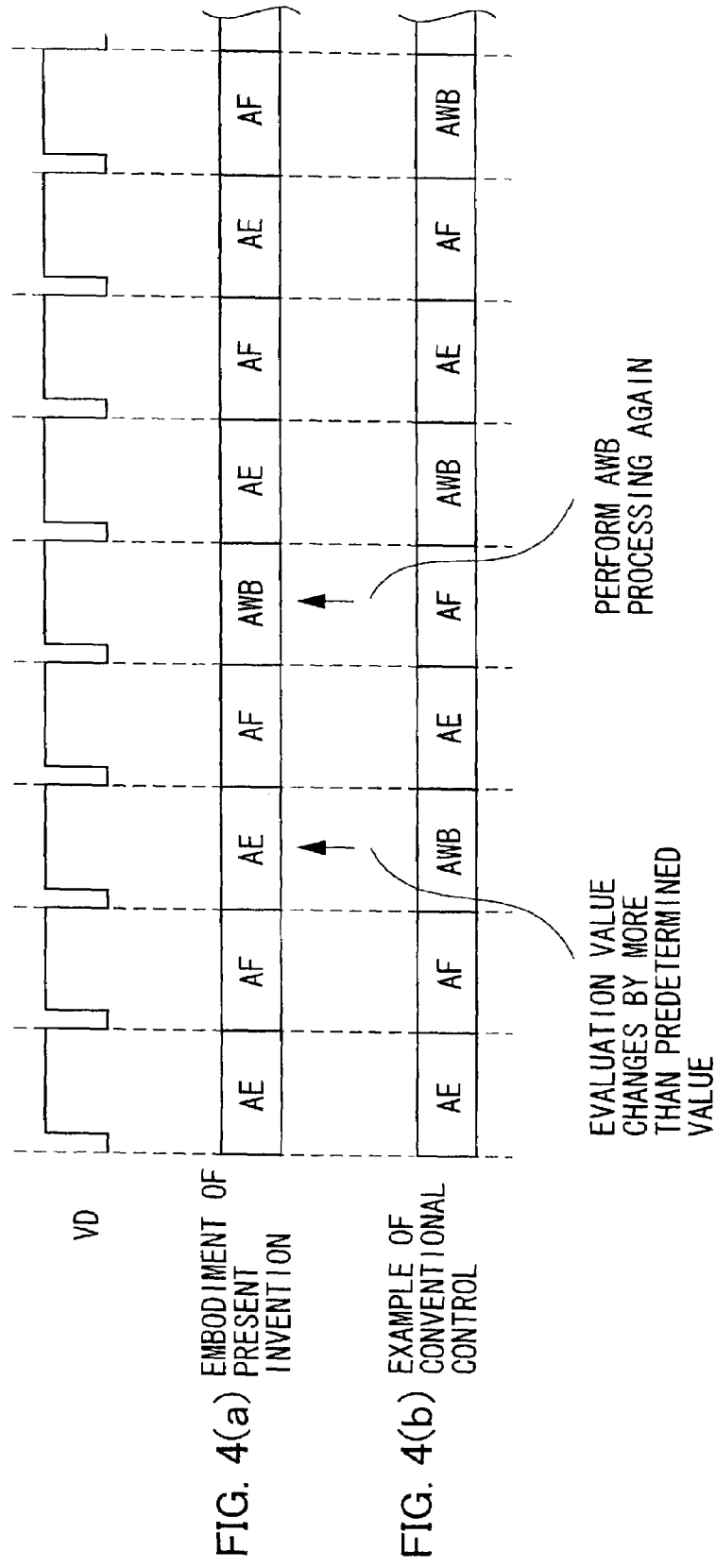

AUTO WHITE BALANCE CONTROLLING METHOD AND ELECTRONIC CAMERA

BACKGROUND OF THE INVENTION

1. Field of the Invention

The present invention relates to an auto white balance controlling method and an electronic camera, and more specifically to a controlling technique for auto white balance adjustment applied to a digital camera or a video camera that can record a motion picture.

2. Description of the Related Art

Electronic image capturing apparatuses such as a video camera have an auto white balance adjustment function for balancing colors within a screen. Japanese Patent Application Publication No. 6-351037 proposes a method for continuously performing auto white balance (AWB) processing while capturing a motion picture by using an image signal obtained from an imaging device. According to this, a stable continuous AWB is achieved by reducing an abrupt change in a gain by integrating an integral of a color signal obtained from a screen corresponding to a field in a television system by several screens in a direction of time.

For such a method, however, high throughput has been required for a central processing unit (CPU) included in a camera because the CPU has to concurrently perform multiple processings including auto-focus (AF) processing, automatic exposure control (AE) processing, image processing and memory recording in addition to the above-mentioned AWB processing while capturing a motion picture. This has contributed to a higher cost of the camera.

On the other hand, if AWB while a motion picture is captured is fixed (made constant) due to the limited performance of the CPU, white balance adjustment cannot keep up with a change in a scene, for example in the case of a scene captured with a camera moving from an indoor scene into an outdoor scene. This is disadvantageous for resulting in a picture with unbalanced color.

SUMMARY OF THE INVENTION

The present invention is adapted in view of the above-mentioned problems. The present invention intends to provide an auto white balance controlling method and an electronic camera which can implement the same method, which downgrades performance of a CPU to reduce the cost and attains a good image by making a white balance adjustment react instantaneously to a change in a scene, which is big enough for a light source to change.

To attain the above-described object, the present invention is directed to a method for controlling auto white balance of an electronic camera for capturing a motion picture, wherein: a motion picture is captured with white balance being adjusted by performing auto white balance processing at a beginning of capturing of the motion picture, the adjusted white balance being fixed; an evaluation value for automatic exposure control is monitored while the motion picture is captured with the fixed white balance; and when the evaluation value changes by more than a predetermined value, the auto white balance processing is performed again with resetting the fixed white balance.

According to the present invention, white balance is adjusted at the beginning of capturing a motion picture by performing auto white balance (AWB) processing, and a motion picture is captured with keeping the state. That is to say, no regular (i.e., periodical) auto white balance processing is performed while the motion picture is captured. On the other hand, an evaluation value for AE is obtained while the motion picture is captured, and when the evaluation value changes by more than a predetermined value, auto white balance processing is performed again.

Eliminating regular auto white balance processing from a period of capturing a motion picture can reduce a load of processing for a control unit. If brightness of the subject changes to a large extent according to a change in a scene being captured, a type of light source may also change. By performing auto white balance processing accordingly, a good image with properly adjusted color balance can be attained.

In the present invention, when auto white balance processing is performed again, white balance is fixed again. It is preferable to then repeat a control to monitor an evaluation value for AE while a motion picture is captured, and when the evaluation value changes by more than a predetermined value, perform auto white balance processing again.

The present invention is also directed to an electronic camera that can perform the above-mentioned method, comprising: an imaging device which converts an optical image of a subject into an electronic signal; an evaluation value calculation device which calculates an evaluation value for automatic exposure control according to a signal obtained from one of the imaging device and another photoelectric conversion device; a white balance control value calculation device which calculates a white balance control value for each color channel according to an image signal obtained through the imaging device; a white balance adjustment device which performs a white balance adjustment by controlling a signal from each color channel according to the calculated white balance control value; and a controlling device which controls to perform auto white balance processing by operating the evaluation value calculation device, the white balance control value calculation device and the white balance adjustment device at a beginning of capturing of a motion picture and to fix white balance according to a processing result, monitors an evaluation value for the automatic exposure control during the capturing of the motion picture with the fixed white balance, and when the evaluation value changes by more than a predetermined value, performs auto white balance processing again with resetting the fixed white balance.

In controlling AE, an evaluation value for AE can be calculated by using an image signal obtained from the imaging device, or by using a signal of brightness of the subject obtained by a photoelectric conversion device (a photometric device) other than the imaging device.

The electronic camera according to the present invention eliminates regular auto white balance processing while capturing a motion picture and performs auto white balance processing again on the condition that an evaluation value for AE changes to a large extent, so that a white balance appropriate for a scene can be attained in the case of large change occurring in a scene being captured, which can be performed even in a CPU with rather low throughput.

Preferably, the electronic camera further comprises: an evaluation value storage device which stores the evaluation value obtained at a moment of performing auto white balance processing, wherein the controlling device determines whether auto white balance is performed again or not by comparing the evaluation value stored in the evaluation value storage device with the evaluation value obtained while the motion picture is captured, and when auto white balance processing is performed again, rewrites the evaluation value stored in the evaluation value storage device with a new evaluation value.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a flow chart showing a controlling procedure of auto white balance in a motion picture capturing mode; and FIGS. 4(a) and 4(b) are timing charts showing a comparison between the controlling according to the embodiment of the present invention and an example of conventional controlling.

DETAILED DESCRIPTION OF THE PREFERRED EMBODIMENTS

Preferred embodiments of an auto white balance controlling method and an electronic camera will be described in detail with reference to attached drawings below.

Figure 1:
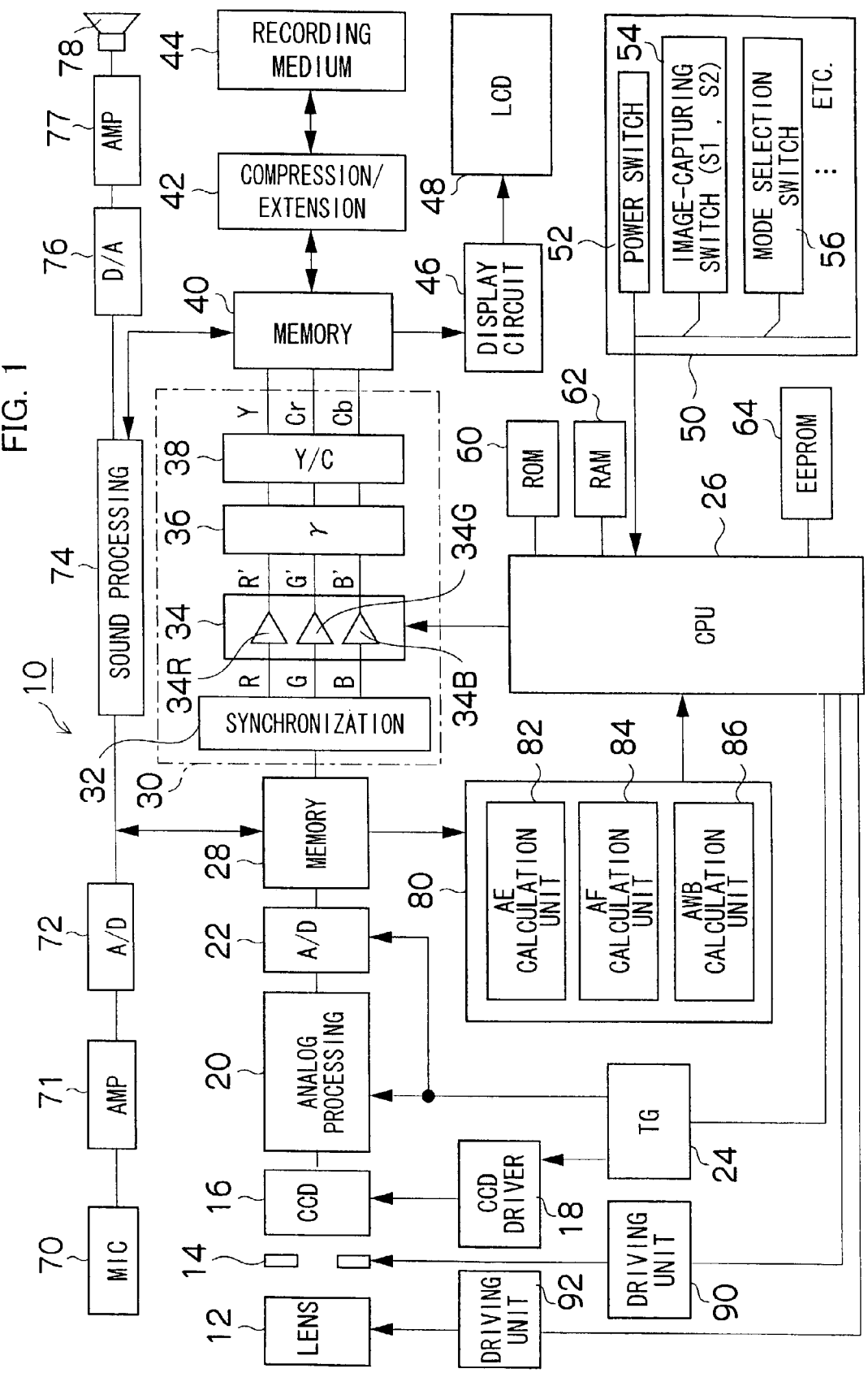
FIG. 1 is a block diagram showing a configuration of an electronic camera according to an embodiment of the present invention.

FIG. 1 is a block diagram showing a configuration of an electronic camera 10 according to an embodiment of the present invention. The camera 10 is a digital camera that enables a still image and a sound-accompanying motion picture to be recorded and played. An optical image of a subject is projected on a photoreceptive surface on a CCD solid-state imaging device (hereinafter referred to as CCD) 16 through a taking lens 12 and a diaphragm 14, and is photoelectrically converted to signal charge by the CCD 16. On the photoreceptive surface of CCD 16, a great number of photodiodes are flatly arranged in a honeycomb matrix, Bayer matrix or other predetermined color filter matrix structures. The CCD 16 also has an electronic shutter function for controlling charge storage period (shutter speed) for each photodiode. A CMOS image sensor or other imaging devices may substitute the CCD 16.

The signal charge accumulated in each photodiode of the CCD 16 is sequentially read out as a voltage signal according to signal charge on the basis of pulses provided by a CCD driver 18. The voltage signal (image signal) sequentially read out from the CCD 16 is sent to an analog processing unit 20, where an RGB signal for each pixel is sampling-held, subjected to a predetermined processing such as a gain adjustment, and then converted into a digital signal by an A/D converter 22.

A timing generator (TG) 24 provides a timing signal for synchronized driving with the CCD driver 18, the analog processing unit 20 and the A/D converter 22 according to an instruction from a CPU 26. The circuits are synchronized with this timing signal.

An RGB signal outputted from the A/D converter 22 is temporally stored in a memory 28. The RGB signal stored in the memory 28 is then sent to a digital processing unit 30. The digital processing unit 30 includes a synchronization circuit 32, a white balance adjustment circuit 34, a gamma control circuit 36, and a luminance and color-difference signal (YC signal) generation circuit 38.

The synchronization circuit 32 converts the RGB signal read out from the memory 28 from dot-sequential to synchronized system, and outputs the RGB signal to the white balance adjustment circuit 34. The white balance adjustment circuit 34 comprises multipliers 34R, 34G, and 34B for adjusting each of digital values of the RGB signal, which is provided to the multipliers 34R, 34G, and 34B, respectively.

Signals indicating white balance control values (gain values) Rg, Gg, or Bg for controlling white balance is provided from the CPU 26 to another input of each of the multipliers 34R, 34G, and 34B. Each of the multipliers 34R, 34G, and 34B multiplies the two inputs, and outputs R', G', or B' signal, which has been white balance adjusted through this multiplication.

The signals (R', G', and B' signals) outputted from the white balance adjustment circuit 34 are sent to the gamma control circuit 36. The gamma control circuit 36 changes input/output characteristics so that the white-balance-adjusted R', G', and B' signals have desired gamma characteristics, and outputs the gamma controlled signals to the YC signal generation circuit 38. The YC signal generation circuit 38 generates a luminance signal Y and color-difference signals Cr and Cb from the gamma controlled RGB signal. The luminance signal Y and the color-difference signals Cr and Cb (YC signal) are stored in a memory 40. The memory 40 may be either the same memory space as the memory 28 or a different memory region.

The YC signal stored in the memory 40 upon the image capturing is compressed by a compression/extension circuit 42 according to a predetermined format and recorded in a recording medium 44. For example, a still image is recorded in JPEG (Joint Photographic Experts Group) format, while a motion picture is recorded in motion JPEG format. Compression formats are not limited to the above-mentioned formats, and MPEG (Moving Picture Experts Group) or other formats can be used.

The recording medium 44 as an image data storing device is not limited to a semiconductor memory represented as a memory card but may be various types of media including a magnetic tape, a magnetic disk, an optical disk and a magneto-optical disk. The recording medium 44 is also not limited to a removable medium, which can be detachably mounted in a camera body, but may be a recording medium (interior memory) incorporated in the camera 10.

To output an image being captured to a monitor, image data stored in the memory 40 is sent to a display circuit 46. The display circuit 46 converts the inputted image data into a signal in a predetermined format for display (e.g., a multi-color image signal in NTSC format) and outputs the signal to a liquid crystal monitor (LCD) 48. The image being captured is displayed in real time by periodically overwriting the image data in the memory 40 with an image signal outputted from the CCD 16 and providing the image signal generated from the image data for the liquid crystal monitor 48. The user can check the angle of the image being captured by the image (hereinafter referred to as a through image) displayed on the liquid crystal monitor 48.

On the liquid crystal monitor 48, a replay of an image stored on the recording medium 44, information on currently set mode, information on compression rate of the image, date and time information, frame number, reusable times and the like can be displayed along with the image being captured. The liquid crystal monitor 48 can also be used as a display screen for a user interface for the user to perform various settings, displaying menu information including set items if required. A display device mounted on the camera 10 is not limited to the liquid crystal monitor 48 but can include an organic EL or other image display devices.

The CPU 26 functions as a controlling device centrally controlling the camera system according to a predetermined program and a calculation device performing various calculations. In other words, the CPU 26 controls operations of the circuits within the camera 10 on the basis of indication signals from an operation unit 50, and performs an AE/AF/AWB control, a lens driving control, an image-capturing control, an image processing control, a read/write to/from a recording medium 44 control, a display control of liquid crystal monitor 48, etc.

A ROM 60 connected to the CPU 26 stores programs to be executed by the CPU 26 and various kinds of data necessary for controlling, and a RAM 62 is used as a working area of the CPU 26. An EEPROM 64 stores data necessary for controlling AE, AF and AWB and the like and customized information set by the user. Those kinds of data are used by the CPU 26 if required. The ROM 60, which is non-volatile storage device, may be non-rewritable type or a rewritable type like EEPROM.

The operation unit 50 is a device through which the user can enter various instructions to the camera 10. The operation unit 50 includes various operation devices such as a power switch 52 for turning ON/OFF a main power, an image-capturing switch 54 to enter instruction to start capturing an image, a mode selection switch 56 for selecting an operation mode, menu buttons for indicating a display of a menu screen, a cross button to enter an instruction such as a selection of a menu item (cursor movement) or a frame advance/reverse of an image being played, an OK button for indicating confirmation (registration) of a selected item or performance of an operation, a BACK button to be used for clearing a desired object such as a selected item or canceling instructed contents or returning to a previous screen, and a zoom switch.

The image-capturing switch 54 comprises a two-stage switch, which has an S1 switch to be turned ON when the switch 54 is pressed halfway and an S2 switch to be turned ON when the switch 54 is pressed to the bottom. The image-capturing switch 54 is used as a release button while a still image is recorded and a recording button (a start/stop button) while a motion picture is recorded.

When a motion picture capturing mode is selected with the mode selection switch 56, a sound-accompanying motion picture can be recorded. Pressing down the image-capturing switch 54 (S2=ON) starts a recording operation, and pressing down the image-capturing switch 54 for the second time (S1=ON) stops the recording operation. It can also be configured to perform a recording operation while the image-capturing switch 54 being pressed and to stop the operation when the switch 54 is released.

While a motion picture is captured, sound is picked up with a microphone 70 and the picked-up signal (a sound signal) is amplified through an amplifier 71, converted to a digital signal by an A/D converter 72, and sent to a sound processing unit 74. The sound processing unit 74 converts the inputted sound data into a predetermined signal format. The sound data generated in this manner is stored in the memory 40, compressed by the compression/extension circuit 42 together with the image data, and recorded on the recording medium 44.

On the other hand, when a play mode is selected with the mode selection switch 56, latest image file recorded in the recording medium 44 (the file recorded last) is read out. If the file involved in the last record is a still image file, compression data of the read out image file is extended to non-compressed YC signal through the compression/extension circuit 42 and outputted to the liquid crystal monitor 48 through the display circuit 46. This enables image contents of the file to be displayed on the liquid crystal monitor 48.

If the file to be played is a motion picture file, the first frame of the motion picture is displayed as a representative image and serves as a screen for receiving an instruction to start playing the motion picture. When a predetermined operation is performed on the operation unit 50 to start playing the motion picture with displaying the first frame of the motion picture, playback processing of the motion picture file starts and the motion picture appears on the liquid crystal monitor 48, while the sound data is processed for playing at the sound processing unit 74 and outputted through a D/A converter 76 and an amplifier 77 to a speaker 78. In this manner, the sound recorded along with the motion picture is played.

Operating a right key or a left key on the cross button during a period of playing a frame of a still image (including a period of playing a first frame of a motion picture) can switch a file to be played (frame advance/reverse). The image file on an advanced or reversed frame location is read out from the recording medium 44 and a still image or a motion picture is played on the liquid crystal monitor 48 as the above-mentioned manner.

An automatic calculation unit 80 is a device performing a calculation required for AE, AF, and AWB controlling, and comprises an AE calculation unit 82, an AF calculation unit 84, and an AWB calculation unit 86. The AE calculation unit 82 includes a circuit that divides a single screen into multiple areas (e.g., 8×8) and integrates RGB signals in each divided area, and provides the integrated value to the CPU 26. The CPU 26 determines brightness of a subject (subject luminance) on the basis of the integrated value obtained from the AE calculation unit 82 and calculates an appropriate exposure value for capturing the image (image-capturing EV value). According to the calculated exposure value and a predetermined program chart, an f-number and a shutter speed are calculated. Then, an appropriate amount of exposure light is attained by controlling the electronic shutter of the CCD 16 and an iris driving unit 90 including an iris motor.

The AWB calculation unit 86 has a similar configuration as that of the above-mentioned AE calculation unit 82 and integrates inputted each color signal of RGB. The AWB calculation unit 86 includes a circuit that divides a single screen into multiple areas (e.g., 8×8) and calculates an average integrated value for each color of RGB signals for each area, and provides the calculated value to the CPU 26.

The CPU 26 obtains the integrated values for R, B and G, calculates ratio of R/G and B/G, performs scene determination (determination of type of light source) on the basis of values of R/G and B/G and information on image-capturing EV value through AE calculation, controls an amplifier gain for the white balance adjustment circuit 34 so that a value of each ratio becomes approximately one (i.e., integration ratio for an RGB within a single screen to be R:G:B≈1:1:1) according to a predetermined white balance adjustment value appropriate for a scene, and controls a signal of each color channel. In determination of a scene, color temperature information such as R-Y, B-Y can be used instead of using values of R/G and B/G.

For AF control in the camera 10, contrast AF is applied, which moves the image-taking lens 12, for example, to make a high frequency component of G signal of an image signal to be maximal. That is, the AF calculation unit 84 comprises a high pass filter for passing only the high frequency component of G signal, an absolute value-making processing unit, an AF area extracting unit for cutting out a signal from an area to be focused, which is predetermined within a screen (e.g., at the center of the screen), and an integration unit for integrating the absolute value data in the AF area.

Data on the integrated values calculated at the AF calculation unit 84 is communicated to the CPU 26. The CPU 26 calculates a focus evaluation value (AF evaluation value) at multiple AF determination points and decides a lens position of a maximal AF evaluation value among the values calculated at the AF determination points as a focusing point, while moving the focusing lens (a movable lens contributing to focus adjustment among lens optical system forming the taking lens 12) by controlling a focus driving unit 92 including an AF motor. Then, the CPU 26 controls the focus-driving unit 92 to move the focusing lens to the calculated focusing point.

Figure 2:
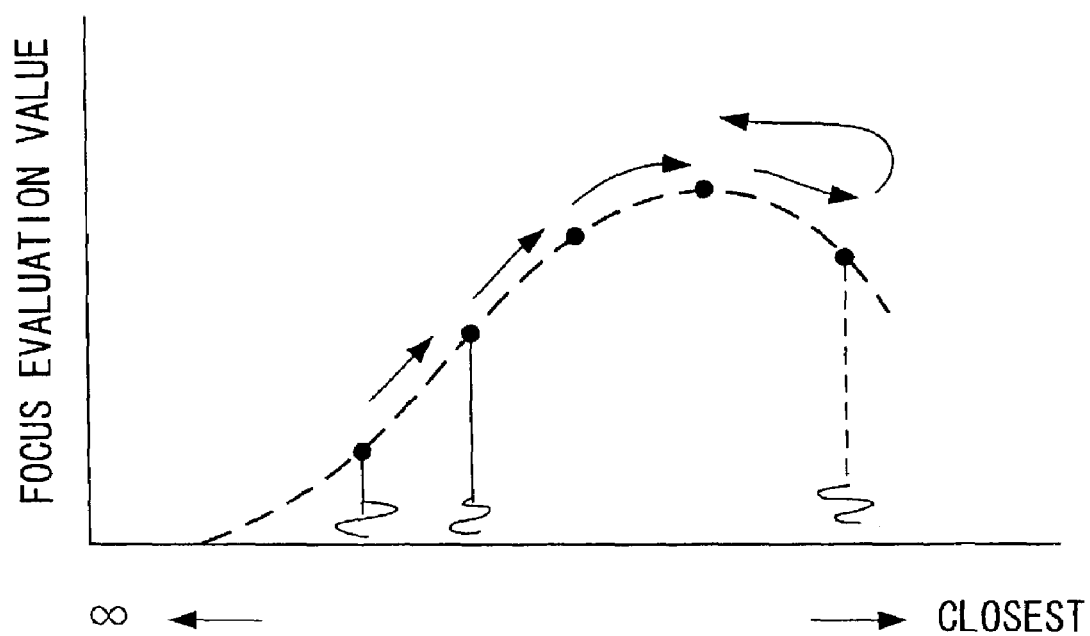
FIG. 2 is a graph illustrating a focusing operation in AF.

While a motion picture is captured, consecutive AF processing (continuous AF), so-called "hill-climbing" is performed. That is, as shown in FIG. 2, the CPU 26 makes the focusing lens gradually move toward the maximal point of the AF evaluation values, by checking the direction of fluctuations of the focus evaluation values with slightly moving the focusing lens to and fro along the optical axis. The calculation of the AF evaluation value is not limited to an aspect of using G signal but may use other image signals such as luminance signal (Y signal).

Next, a method for controlling auto white balance in the camera 10 configured in the above-mentioned manner will be described.

FIG. 3 is a flow chart showing a control procedure of auto white balance in the motion picture capturing mode. Upon activating the camera 10 in the motion picture capturing mode, immediately after switch-on (step S110), auto white balance processing is performed (step S112). This is for adjusting white balance for a through image. Then, the CPU 26 determines whether the S1 of the image-capturing switch 54 is turned ON or not (step S114). If the image-capturing switch 54 is not pressed, the process of step S114 loops to maintain a state of the through image display. While the through image is displayed, AWB processing is not performed and the white balance is fixed.

When the user presses the image-capturing switch 54 and an instruction to prepare for capturing an image is inputted (when the CPU 26 detects S1=ON), the CPU 26 performs AE, AF, and AWB processing (step S116) and stores an AE evaluation value at this moment on the RAM 62 (step S118). The AE evaluation value may be either an integrated value obtained from the AE calculation unit 82 or an exposure value calculated from the integrated value and the like.

Then, the CPU 26 determines whether the S1 is released or not (step S120). If the S1 is released before the S2 is turned ON (if the user cancels preparation for capturing an image in midway), the process returns to step S114. On the other hand, if the S1 is not released at step S120, it is determined whether the S2 is turned ON or not (step S122).

If the S2 is not turned ON at step S122, the process returns to step S120 and the processes of the steps S120-S122 loop. When the S1 is released during this period, the process returns to step S114.

On the other hand, if S2=ON is detected at step S122, a motion picture capturing is started for recording (step S124). The motion picture is recorded at a predetermined frame rate. During the recording operation, the CPU 26 monitors the state of the image-capturing switch 54, while determining whether to terminate the recording or not by managing the recording time (step S126). If no instruction to stop the recording is entered and recording time is less than a maximum available recording time, the image continues to be captured. During this period, processing of continuous AE and AF is performed, and an AE evaluation value and an AF evaluation value are obtained.

Then, the AE evaluation value obtained while the motion picture is captured and the AE evaluation value stored at the previous AWB processing are compared to determine whether the AE evaluation value is changed by more than a predetermined value (e.g., more than 1 EV) or not (step S128). The predetermined value to be a reference of determination is not limited to 1 EV and may be set appropriately and/or variably. This determination is not limited to an aspect of determining a change in an evaluation value for entire screen and may determine a change in an evaluation value for some areas among divided multiple areas.

If the AE evaluation value does not change to a large extent, the process returns to step S126 and continues recording of the motion picture by continuous AE/AF with a fixed AWB. On the other hand, if the AE evaluation value is determined to have changed by more than the predetermined value at step S128, the AWB processing is performed again (step S130) and white balance adjustment is performed again, while the AE evaluation value at that moment is stored in RAM 62 (step S132). In this manner, only when a considerable change in luminance occurs while the motion picture is captured, the AWB processing is performed and information on the AE evaluation value on the implementing AWB processing is updated.

Then, the process returns to step S126. Steps S126-S132 are repeated until the recording ends. When the user enters an instruction to stop recording, or when the image has been recorded for the set maximum available recording time, determination becomes YES at step S126 and capturing of the motion picture terminates (step S140).

According to the present embodiment, the AWB processing is only performed when the evaluation value for AE changes by more than the predetermined value without performing periodical AWB processing while a motion picture is captured so that processing load for the CPU 26 can be reduced and white balance can be automatically adjusted again in response to a large change in the scene being captured. As a result, natural good motion picture can be attained, while the camera 10 may be manufactured in low cost.

FIGS. 4(*a*) and 4(*b*) show a comparison between the control according to the embodiment of the present invention and an example of conventional control. Consider that capturing of a motion picture is controlled by means of a CPU with a calculation ability that can execute only one process among AE, AF, or AWB in 1V period in synchronism with vertical driving signal (VD) from an imaging device. According to the present embodiment (FIG. 4(*a*)), white balance is fixed by auto white balance (AWB) processing that is performed when the capturing of the motion picture is started, so that only the AE processing and the AF processing are performed periodically, and when a change in the AE evaluation value more than a predetermined value is detected, the AWB processing is performed again.

To the contrary, in the conventional controlling method (FIG. 4(*b*)), every processing of AE, AF, and AWB is periodically performed. It is apparent from the comparison of those two examples, the present embodiment allows the AE processing and the AF processing to be performed once in 2V, so that AE and AF with high tracking ability can be performed and appropriate AWB adjustment can also be performed in response to a change in a scene even with a CPU having a low performance.

In the above-mentioned embodiment, although a digital camera that can capture a motion picture is described, the present invention is not limited to be applied to this range and may be applied to various image capturing apparatuses that can capture a motion picture such as a video camera or a DVD cam.

As mentioned above, according to the present invention, an AE evaluation value is obtained while a motion picture is captured, and when the evaluation value changes by more than a predetermined value, auto white balance processing is performed again without performing periodical auto white balance while the motion picture is captured. This can reduce a processing load of a control unit. Accordingly, a circuit with relatively low throughput can be used as a controlling circuit (such as CPU) of a camera, which contributes to reduce the cost of the camera.

When a scene being captured changes to a large extent to cause brightness of a subject to fluctuate, like when a camera is moved from an indoor scene to an outdoor scene or when a camera is panned, auto white balance is performed so that an image with color balance appropriate for the scene can be attained.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for controlling auto white balance of an electronic camera for capturing a motion picture, comprising:
    performing an auto white balance processing at a beginning of capturing of the motion picture and fixing white balance control values;
    monitoring an evaluation value for an automatic exposure control while continuing the capturing of the motion picture with the fixed white balance control values;
    when the evaluation value for the automatic exposure control changes by more than a predetermined value, performing the auto white balance processing again and resetting the fixed white balance control values.

2. An electronic camera, comprising:
    an imaging device which converts an optical image of a subject into an image signal;
    an evaluation value calculation device which calculates an evaluation value for an automatic exposure control according to the image signal obtained from the imaging device;
    a white balance control value calculation device which calculates a white balance control value for each color channel according to the image signal obtained through the imaging device;
    a white balance adjustment device which performs a white balance adjustment by controlling a signal from each color channel according to the calculated white balance control value for each color channel; and
    a controlling device which controls to perform an auto white balance processing by operating the evaluation value calculation device, the white balance control value calculation device and the white balance adjustment device at a beginning of capturing of a motion picture and to fix the white balance control value for each color channel according to a processing result, monitors the evaluation value for the automatic exposure control during the capturing of the motion picture with the fixed white balance control values for each color channel, and when the evaluation value changes by more than a predetermined value, performs auto white balance processing again and resets the fixed white balance control value for each color channel according to a result of performing the auto white balance processing again.

3. The electronic camera according to claim 2, further comprising:
    an evaluation value storage device which stores the evaluation value obtained at a moment of performing auto white balance processing,
    wherein the controlling device determines whether auto white balance is to be performed again or not by comparing the evaluation value stored in the evaluation value storage device with the evaluation value obtained while the motion picture is captured, and when auto white balance processing is performed again, rewrites the evaluation value stored in the evaluation value storage device with a new evaluation value.

4. A method for controlling an auto white balance process of an electronic camera, comprising:
    initially determining reference white balance control values;
    initially determining a reference exposure value;
    starting a motion picture capture process after both the reference white balance control values and the reference exposure value are initially determined; and
    while the motion picture capture process is occurring, repeating the steps of:
    performing the auto white balance process based on the reference white balance control values;
    determining a new exposure value;
    determining if a difference between the new exposure value and the reference exposure value is greater than a predetermined amount;
    setting the new exposure value as the reference exposure value when it is determined that the difference between the new exposure value and the reference exposure value is greater than the predetermined amount; and
    determining new auto white balance control values and setting the new auto white balance control values as the reference white balance control values when it is determined that the difference between the new exposure value and the reference exposure value is greater than the predetermined amount.

5. The method for controlling the auto white balance of the electronic camera according to claim 4, wherein the step of determining the new white balance control values comprises:
    dividing an image frame into a plurality of areas;
    calculating an average integrated RGB values for colors RGB for each of the plurality of areas; and
    determining RGB gain values for the colors RGB such that a ratio R:G:B of the image frame is substantially a predetermined desired R:G:B ratio,
    wherein the RGB gain values are the new white balance control values.

6. The method for controlling the auto white balance of the electronic camera according to claim 5, wherein the predetermined desired R:G:B ratio is 1:1:1.

7. The method for controlling the auto white balance of the electronic camera according to claim 5, wherein the step of determining the RGB gain values for the colors RGB such that the ratio R:G:B of the image frame is substantially the predetermined desired R:G:B ratio comprises:
    calculating ratios R/G and B/G for each of the plurality of areas based on the average integrated RGB values for the colors RGB for each of the plurality of areas; and
    calculating the gain for each of the colors RGB based on the calculated ratios R/G and B/G.

8. The method for controlling the auto white balance of the electronic camera according to claim 5, wherein the step of determining the gain for each of the colors RGB such that the ratio R:G:B of the image frame is substantially the predetermined desired R:G:B ratio comprises:

calculating color difference signals R-Y and B-Y for each of the plurality of areas based on the average integrated RGB values for the colors RGB for each of the plurality of areas; and calculating the gain for each of the colors RGB based on the calculated ratios R/G and B/G.

9. The method for controlling the auto white balance of the electronic camera according to claim 4, wherein the step of performing the auto white balance process based on the reference white balance control values comprises:

setting a gain value for each color RGB based on the reference white balance control values for an input image frame; and multiplying each color RGB of each pixel of the input image frame by the respective gain value to output an output image frame.

10. The method for controlling the auto white balance of the electronic camera according to claim 4, wherein the step of determining a new exposure value comprises:

detecting a brightness of a subject; and calculating the new exposure value appropriate to capture the subject in an image frame based on the brightness of the subject.

* * * * *